United States Patent
Sullivan et al.

(10) Patent No.: US 8,047,781 B2
(45) Date of Patent: Nov. 1, 2011

(54) BOLT ASSEMBLY FOR STEAM TURBINE ENGINES AND METHOD OF ASSEMBLING THE SAME

(75) Inventors: Christopher Sullivan, Galway, NY (US); James David Schuhl, Charlton, NY (US)

(73) Assignee: General Electric Company, Schenectady, NY (US)

( * ) Notice: Subject to any disclaimer, the term of this patent is extended or adjusted under 35 U.S.C. 154(b) by 1058 days.

(21) Appl. No.: 11/861,027

(22) Filed: Sep. 25, 2007

(65) Prior Publication Data

US 2009/0081030 A1    Mar. 26, 2009

(51) Int. Cl.
F01D 25/24 (2006.01)

(52) U.S. Cl. .................. 415/214.1; 415/220; 411/351; 411/999

(58) Field of Classification Search .......... 415/214.1, 415/213.1, 220; 411/356, 353, 513, 517, 411/337, 412, 413; 403/336, 337
See application file for complete search history.

(56) References Cited

U.S. PATENT DOCUMENTS

| | | | |
|---|---|---|---|
| 162,077 A | 4/1875 | Kellogg | |
| 1,431,832 A | 10/1922 | Mills et al. | |
| 1,970,078 A * | 8/1934 | Dillon | 285/18 |
| 2,176,601 A * | 10/1939 | Bates | 219/50 |
| 3,152,816 A | 10/1964 | Smith | |
| 3,550,638 A | 12/1970 | Smith | |
| 3,625,282 A * | 12/1971 | Bridges et al. | 166/97.1 |
| 3,743,242 A | 7/1973 | Scaramucci | |
| 3,779,127 A | 12/1973 | Speakman | |
| 3,868,806 A | 3/1975 | Dey | |
| 4,005,629 A | 2/1977 | Franklin | |
| 4,133,351 A | 1/1979 | Harrison et al. | |
| 4,254,542 A | 3/1981 | Craig | |
| 4,268,070 A | 5/1981 | Adams | |
| 4,621,963 A | 11/1986 | Reinwall | |
| 4,625,385 A | 12/1986 | Kohler et al. | |
| 4,875,266 A | 10/1989 | Batten | |
| RE33,490 E * | 12/1990 | Steinbock | 492/2 |
| 5,851,033 A | 12/1998 | Hunt et al. | |
| 5,927,157 A * | 7/1999 | Gosling | 81/57.38 |
| 5,954,466 A | 9/1999 | Coffey et al. | |
| 6,076,861 A * | 6/2000 | Ikeda | 285/112 |
| 6,125,526 A | 10/2000 | Wierzchon | |
| 6,641,236 B2 * | 11/2003 | Grudzien | 312/216 |
| 6,682,281 B1 | 1/2004 | Larsen | |
| 7,052,048 B2 | 5/2006 | Murphy | |
| 7,172,380 B2 | 2/2007 | Lees et al. | |
| 7,213,999 B2 * | 5/2007 | Haas | 403/337 |
| 7,690,698 B1 * | 4/2010 | Curran | 285/367 |

* cited by examiner

*Primary Examiner* — Ninh H Nguyen
(74) *Attorney, Agent, or Firm* — Armstrong Teasdale LLP (57) ABSTRACT

A method of assembling a turbine casing is provided. The method includes inserting a bolt assembly through a first opening defined generally vertically through a first flange extending from a first casing member, such that a portion of the bolt assembly extends a distance upward from an upper surface of the first casing flange and such that the bolt assembly is retained within the first opening. The method further includes positioning a second casing member including a second flange including a second opening defined therein against the first casing member such that a portion of the bolt assembly extends through the opening defined in the second casing flange.

19 Claims, 7 Drawing Sheets

BOLT ASSEMBLY FOR STEAM TURBINE ENGINES AND METHOD OF ASSEMBLING THE SAME

BACKGROUND OF THE INVENTION

This invention relates generally to steam turbine engines, and more particularly, to bolt assemblies used with steam turbine engines.

At least some known steam turbine engines include an upper half casing and a lower half casing wherein the upper half casing includes a horizontal joint flange feature and the lower half casing includes a horizontal joint flange feature. The upper half horizontal joint casing flange and the lower half horizontal joint casing flange are coupled together with a number of bolt and nut assemblies. At least one known bolt assembly, sometimes referred to as a "through" bolt assembly, includes a single bolt, suitably threaded on both ends, and a pair of nuts that are used to couple the pair of flanges together. For example, a single threaded bolt may be inserted through an opening defined within each flange. Moreover, a first nut may be threadably coupled to a first end of the bolt such that the first nut is substantially flush with a surface of the first horizontal joint flange, and a second nut may be threadably coupled to a second end of the bolt such that the second nut is substantially flush with a surface of the second horizontal joint flange. This at least one known bolt assembly is often referred to as a "through" bolt assembly. During assembly of at least one known "through" bolt assembly, when the bolt is inserted through a flange opening, the bolt will fall out of the opening until at least one nut is coupled to the bolt to retain the bolt within the flange. Coupling a nut to the bolt can present difficulty due to space constraints around each flange and due to the difficulty of simultaneously tightening both ends of the bolt assembly.

At least one known bolt assembly, sometimes referred to as a "tapped" bolt assembly, is used when structural sub-assemblies of a steam turbine engine are completely contained within the body of the engine making access to the sub-assembly difficult. At least one known "tapped" bolt assembly includes a threaded hole integral to the lower half horizontal joint flanges. The threaded hole eliminates the need for a second nut coupled to the second horizontal joint flange. Threading the hole integral to a horizontal joint flange can present difficulty due to space constraints. Moreover, during assembly and use of the "tapped" bolt assembly, the threads integral to the horizontal joint flange may be easily worn and/or stripped. When the threads of the hole integral to the horizontal joint flange are worn and/or stripped, the threads are difficult to repair and/or replace.

BRIEF DESCRIPTION OF THE INVENTION

In one aspect, a method of assembling a turbine casing is provided. The method includes inserting a bolt assembly through a first opening defined generally vertically through a first flange extending from a first casing member, such that a portion of the bolt assembly extends a distance upward from an upper surface of the first casing flange such that the bolt assembly is retained within the first opening. The method further includes positioning a second casing member including a second flange including a second opening defined therein against the first casing member such that a portion of the bolt assembly extends through the opening defined in the second casing flange.

In a further aspect, a steam turbine engine assembly is provided. The steam turbine engine includes at least one casing including a flange including at least one opening extending through the flange. The steam turbine engine assembly also includes a bolt assembly configured to be inserted within the at least one casing. The bolt assembly including a bolt and a retaining mechanism, the bolt configured to be inserted from a lower surface of the flange through the at least one opening such that a portion of the bolt extends a distance above an upper surface of the flange, the bolt retaining mechanism at least partially circumscribes the bolt to facilitate retaining the bolt within the at least one opening.

In another aspect, a bolt assembly for a steam turbine engine assembly is provided. The steam turbine engine assembly includes at least one casing including a flange including at least one opening extending through the flange. The bolt assembly includes a bolt configured to be inserted within the at least one casing. The bolt is configured to be inserted from a lower surface of the flange through the at least one opening such that a portion of the bolt extends a distance above an upper surface of the flange. The bolt assembly also includes a retaining ring coupled to the bolt such that the retaining ring at least partially circumscribes the bolt to facilitate retaining the bolt within the at least one opening.

DETAILED DESCRIPTION OF THE INVENTION

Figure 1:
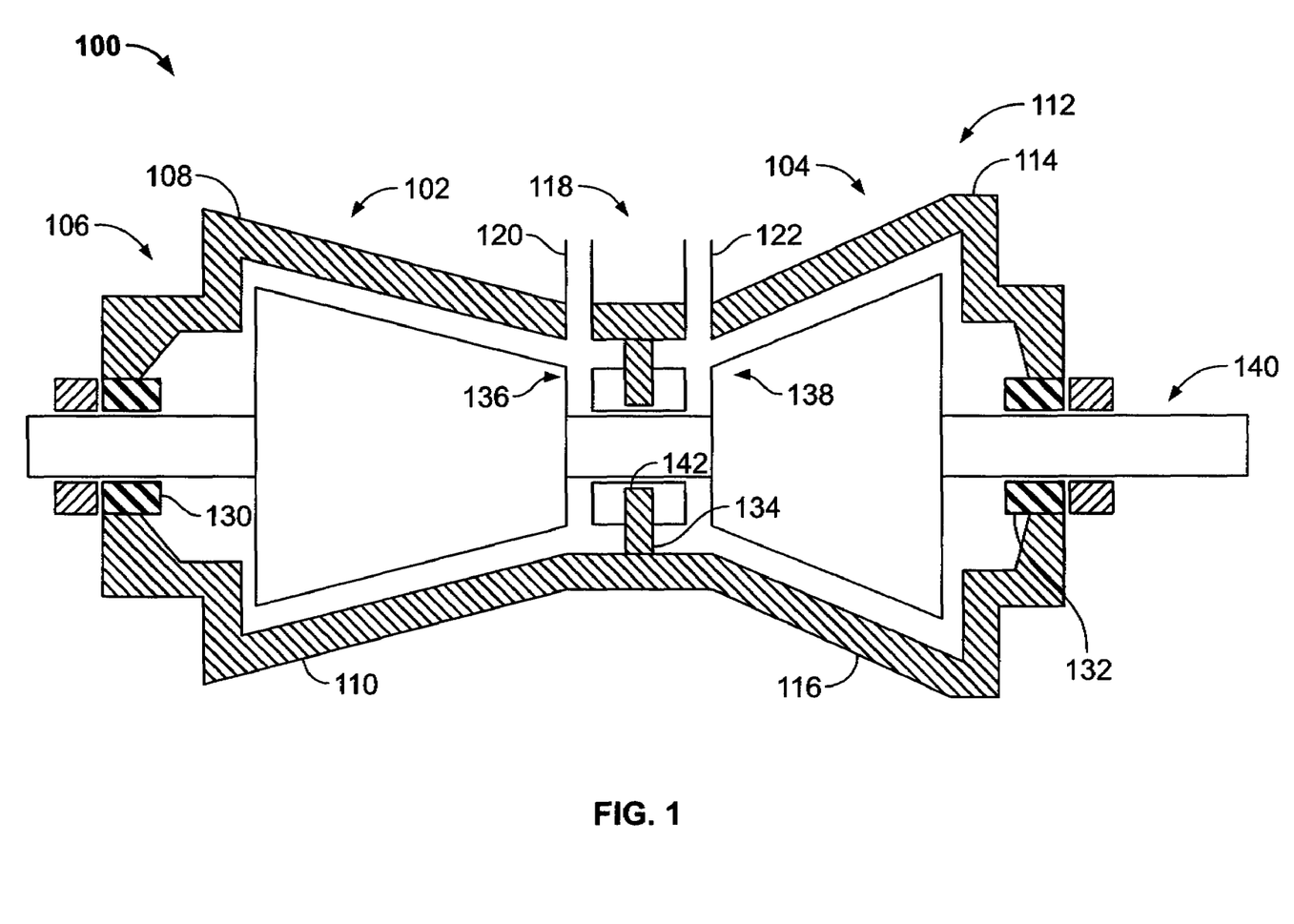
FIG. 1 is a schematic illustration of an exemplary opposed-flow steam turbine engine.

FIG. 1 is a schematic illustration of an exemplary opposed-flow steam turbine engine 100 including a high pressure (HP) section 102 and an intermediate pressure (IP) section 104. An HP shell, or casing, 106 is divided axially into upper and lower half sections 108 and 110, respectively. Similarly, an IP shell 112 is divided axially into upper and lower half sections 114 and 116, respectively. In the exemplary embodiment, shells 106 and 112 are inner casings. Alternatively, shells 106 and 112 are outer casings. A central section 118 positioned between HP section 102 and IP section 104 includes a high pressure steam inlet 120 and an intermediate pressure steam inlet 122.

An annular section divider 134 extends radially inwardly from central section 118 towards a rotor shaft 140 that extends between HP section 102 and IP section 104. More specifically, divider 134 extends circumferentially around a portion of rotor shaft 140 between a first HP section inlet nozzle 136 and a first IP section inlet nozzle 138. Divider 134 is received in a channel 142.

During operation, high pressure steam inlet 120 receives high pressure/high temperature steam from a steam source, for example, a power boiler (not shown in FIG. 1). Steam is routed through HP section 102 from inlet nozzle 136 wherein work is extracted from the steam to rotate rotor shaft 140 via a plurality of turbine blades, or buckets (not shown in FIG. 1) that are coupled to shaft 140. Each set of buckets includes a corresponding stator assembly (not shown in FIG. 1) that facilitates routing of steam to the associated buckets. The steam exits HP section 102 and is returned to the boiler wherein it is reheated. Reheated steam is then routed to intermediate pressure steam inlet 122 and returned to IP section 104 via inlet nozzle 138 at a reduced pressure than steam entering HP section 102, but at a temperature that is approximately equal to the temperature of steam entering HP section 102. Work is extracted from the steam in IP section 104 in a manner substantially similar to that used for HP section 102 via a system of rotating and stationary components. Accordingly, an operating pressure within HP section 102 is higher than an operating pressure within IP section 104, such that steam within HP section 102 tends to flow towards IP section 104 through leakage paths that may develop between HP section 102 and IP section 104.

In the exemplary embodiment, steam turbine engine 100 is an opposed-flow high pressure and intermediate pressure steam turbine combination. Alternatively, steam turbine engine 100 may be used with any individual turbine including, but not being limited to low pressure turbines. In addition, the present invention is not limited to being used with opposed-flow steam turbines, but rather may be used with steam turbine configurations that include, but are not limited to, single-flow and double-flow turbine steam turbines. Moreover, the present invention is not limited to steam turbines, but rather may be used with gas turbine engines.

Figure 2:
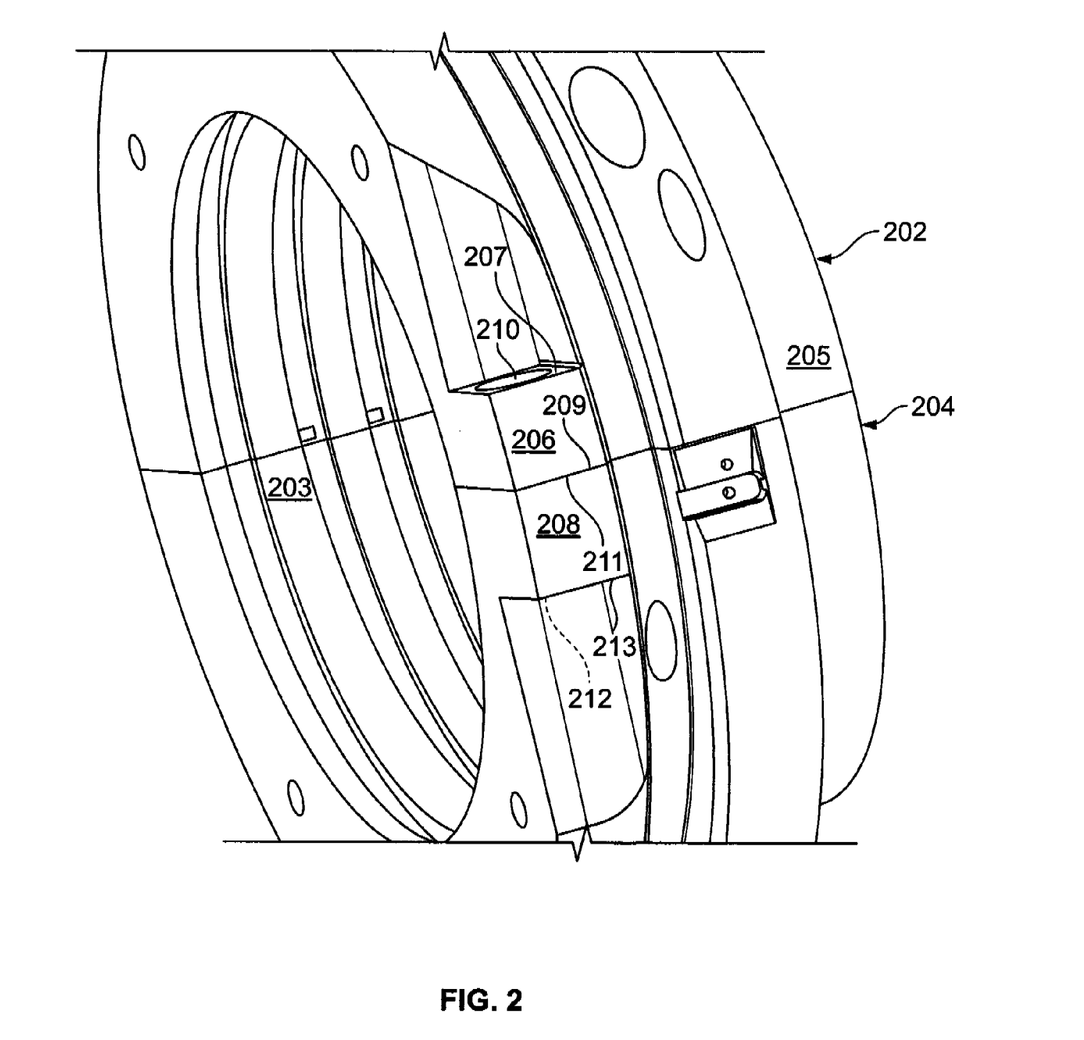
FIG. 2 is a perspective view of an exemplary shell casing that may be used with the steam turbine shown in FIG. 1.

FIG. 2 is a perspective view of an exemplary shell casing 200 that may be used with the steam turbine 100. Shell casing 200 includes an upper casing 202 and a lower casing 204. Each casing 202 and 204 includes a radially inner surface 203 and an opposite radially outer surface 205. Each casing 202 and 204 may include, but is not limited to including, a line of cap screws, a line of studs, and/or any combination thereof.

In the exemplary embodiment, casing 202 includes at least one flange 206, and casing 204 includes at least one flange 208. In the exemplary embodiment, flanges 206 and 208 extend outward from radially outer surfaces 205. In the exemplary embodiment, flanges 206 and 208 receive a bolt assembly 300 therein, as will be discussed in more detail herein. In an alternative embodiment, bolt assembly 300 may be used with any pair of flanges that facilitate coupling casing 202 to casing 204. In an alternative embodiment, shell casing 200 includes a plurality of pairs of flanges 206 and 208 wherein each pair of flanges receives bolt assembly 300.

Each flange 206 and 208 includes at least one opening 210 and 212, respectively, defined therein and sized to receive at least a portion of bolt assembly 300 therethrough. Opening 210 extends between a first surface 207 and a second surface 209 of flange 206, and opening 212 extends between a first surface 211 and a second surface 213 of flange 208. In the exemplary embodiment, opening 210 is counterbored, as will be discussed in more detail below. Moreover, each casing 202 and 204 includes a plurality of openings 214 (shown in FIG. 6) defined at least partially therein. Each opening 214 is sized to receive a dowel (not shown) therein that facilitates assembly of shell casings 202 and 204 and that facilitates aligning casing 202 with casing 204. In an alternative embodiment, each opening 214 receives known traditional hardware that ease assembly. During assembly, in the exemplary embodiment, casings 202 and 204 are coupled together via flanges 206 and 208 such that openings 210 and 212 are substantially concentrically aligned with respect to each other and such that surfaces 209 and 211 are positioned in mating contact with each other.

Figure 3:
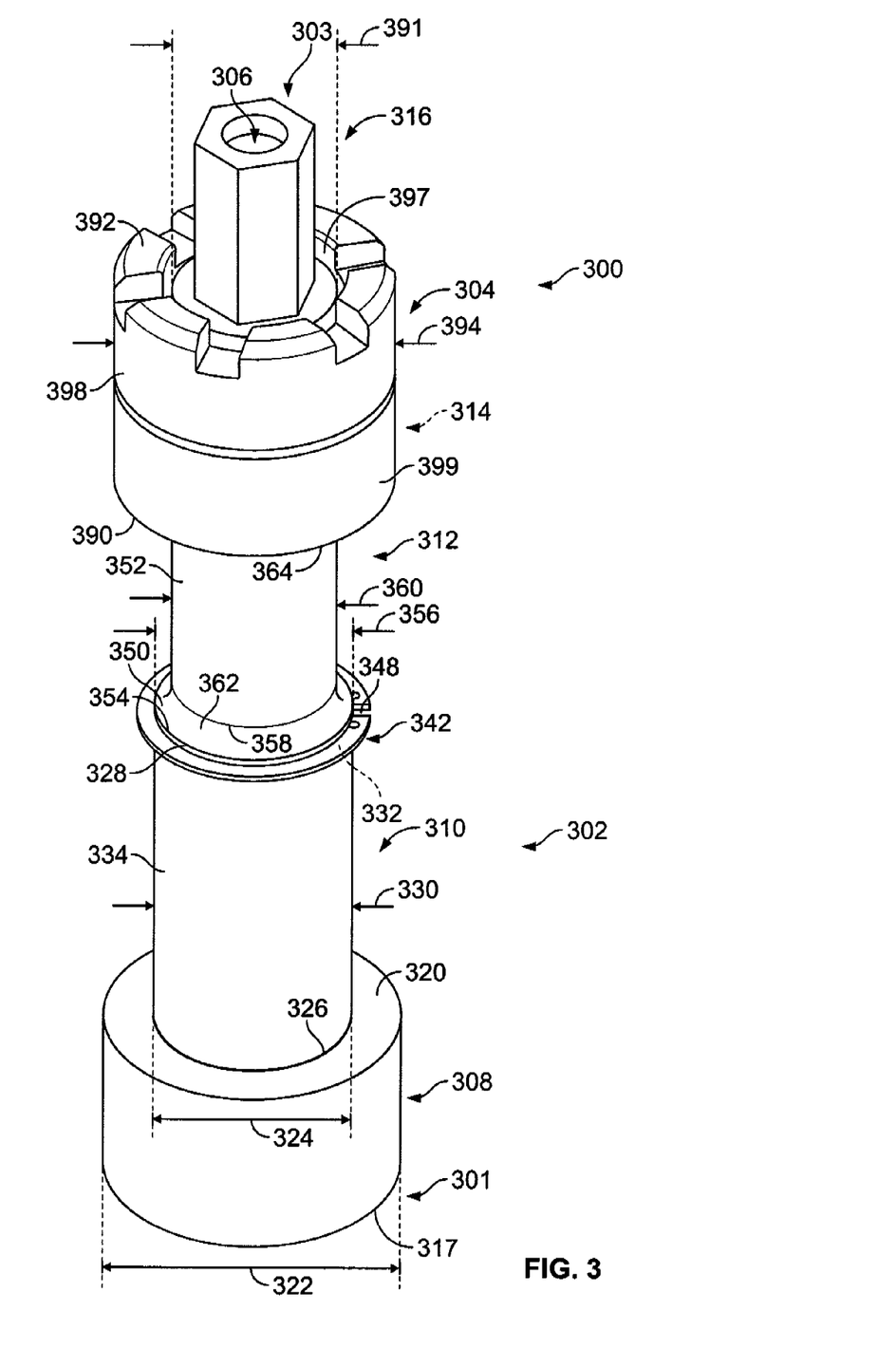
FIG. 3 is a perspective view of an exemplary bolt assembly that may be used with the shell casing shown in FIG. 2.

FIG. 3 is a perspective view of an exemplary bolt assembly 300 that may be used with shell casing 200. Bolt assembly 300 includes a bolt 302 and a nut 304 is configured to threadably couple to bolt 302. The thread orientation on bolt assembly 300 facilitates reducing the amount of rotation necessary to fully assemble assembly 300. In the exemplary embodiment, bolt 302 is a through bolt that includes a first end or a head 301 and an opposing second end 303.

Bolt 302 includes a plurality of portions 308, 310, 312, 314, 316 that extend through flange openings 206 and 208. In the exemplary embodiment, portions 308, 310, 312, 314, 316 are integrally formed together. Moreover, bolt 302 is formed with a bore 306 that extends longitudinally and concentrically therethrough. Bore 306 is sized to receive an electric heater therein. In the exemplary embodiment, bolt 302 is fabricated from at least one of, but is not limited to being fabricated from, an alloy steel, a metallic material, a plastic material, and/or any combination thereof. In an alternative embodiment, portions 308, 310, 312, 314, 316 are independently formed and subsequently coupled together.

In the exemplary embodiment, first portion 308 extends from a first end 317 to an opposite second end 320, and has a substantially cylindrical shape defined by an outer diameter 322. First portion 308 is also defined by an inner diameter 324. In an alternative embodiment, first portion 308 may be formed with any suitable shape that enables bolt assembly 300 to function as described herein.

In the exemplary embodiment, second portion 310 extends from a first end 326 adjacent first portion second end 320 to an opposite second end 328. Second portion 310 is substantially cylindrical and has an outer diameter 330 that is approximately equal to first portion inner diameter 324. As such, the outer diameter 330 of second portion 310 is smaller than the outer diameter 318 of first portion 308. Moreover, second portion 310 is formed with a groove 332 that is defined within an outer surface 334 of second portion 310. In the exemplary embodiment, groove 332 extends circumferentially about second portion 310.

Groove 332 is sized to receive a retaining ring 342 therein. Second portion 310 and ring 342 are sized to ensure load capacity. Moreover, retaining ring 342 is sized such that a portion of retaining ring 342 extends outward from surface 334 when ring 342 is fully seated within groove 332. Retaining ring 342 facilitates retaining bolt 302 within flange 208 during assembly, as will be described in more detail below. In the exemplary embodiment, retaining ring 342 is split and includes a slot 348 that facilitates the assembly of bolt assembly 300.

Third portion 312, in the exemplary embodiment, includes a frusto-conical portion 350 and a substantially cylindrical portion 352. Frusto-conical portion 350 includes a first end 354 formed with a first diameter 356 adjacent second portion second end 328, and a second end 358 formed with a second diameter 360. In the exemplary embodiment, diameter 356 is approximately equal to diameter 330, and is larger than diameter 360. As such, frusto-conical portion 350 tapers inward from first end 354 to second end 358. Cylindrical portion 352 is formed with an outer diameter 360 that is substantially constant from a first end 362, adjacent frusto-conical second end 358, to a second end 364. In the exemplary embodiment, third portion 312 is configured to be inserted into counterbored opening 210.

In the exemplary embodiment, fourth portion 314 is formed with a substantially cylindrical portion 365, a frusto-conical portion 372, and a substantially cylindrical portion 374. Portion 365 has a first end 366 that extends from third portion second end 364 and an opposite second end 368.

Moreover, portion 365 is formed with a substantially constant diameter 370. In the exemplary embodiment, diameter 370 is larger than third portion diameter 360. Moreover, fourth portion 314 includes a plurality of threads 373 that extend about an outer surface outer surface 375 of portion 365. Threads 373 are oriented to engage threads (not shown) defined within nut 304, as described in more detail below.

Frusto-conical portion 372 includes a first end 376, adjacent to second end 368 and formed with a diameter 370, and a second end 380 formed with a second diameter 381 that is smaller than diameter 370. As such, frusto-conical portion 372 tapers from first end 376 to second end 380. Portion 374 has substantially constant diameter 381 from a first end 382, adjacent second end 380, to a second end 383.

Fifth portion 316 has a first end 386 adjacent to fourth portion second end 380, and an opposite second end 388. In the exemplary embodiment, fifth portion 316 has a substantially hexagonal cross-sectional profile. Specifically, fifth portion 316 includes a plurality of wrench flats that facilitate assembly of bolt assembly 300. Alternatively, fifth portion 316 may have any non-hexagonal shape that enables bolt assembly 300 to function as described herein.

In the exemplary embodiment, nut 304 is sized and shaped to threadably couple to bolt 302. Nut 304 extends from a first side 390 to an opposite second end 392 and includes a bore 393 extending therebetween. Nut 304 is substantially cylindrical and has an inner diameter 391 and an outer diameter 394. In the exemplary embodiment, bore diameter 391 is sized to enable nut 304 to engage bolt fourth portion 314. As such, nut 304 includes a plurality of threads 395 formed within an inner surface 397 of nut 304.

In the exemplary embodiment, nut second end 392 includes a plurality of radial slots 396 that are oriented to enable a wrench to engage nut 304 during assembly of bolt assembly 300. Moreover, nut 304 also includes a groove 398 that extends circumferentially about an outer surface 399 of nut 304. Alternatively, nut 304 may be formed with any suitable shape and/or size that enables bolt assembly 300 to function as described herein.

Figure 4:
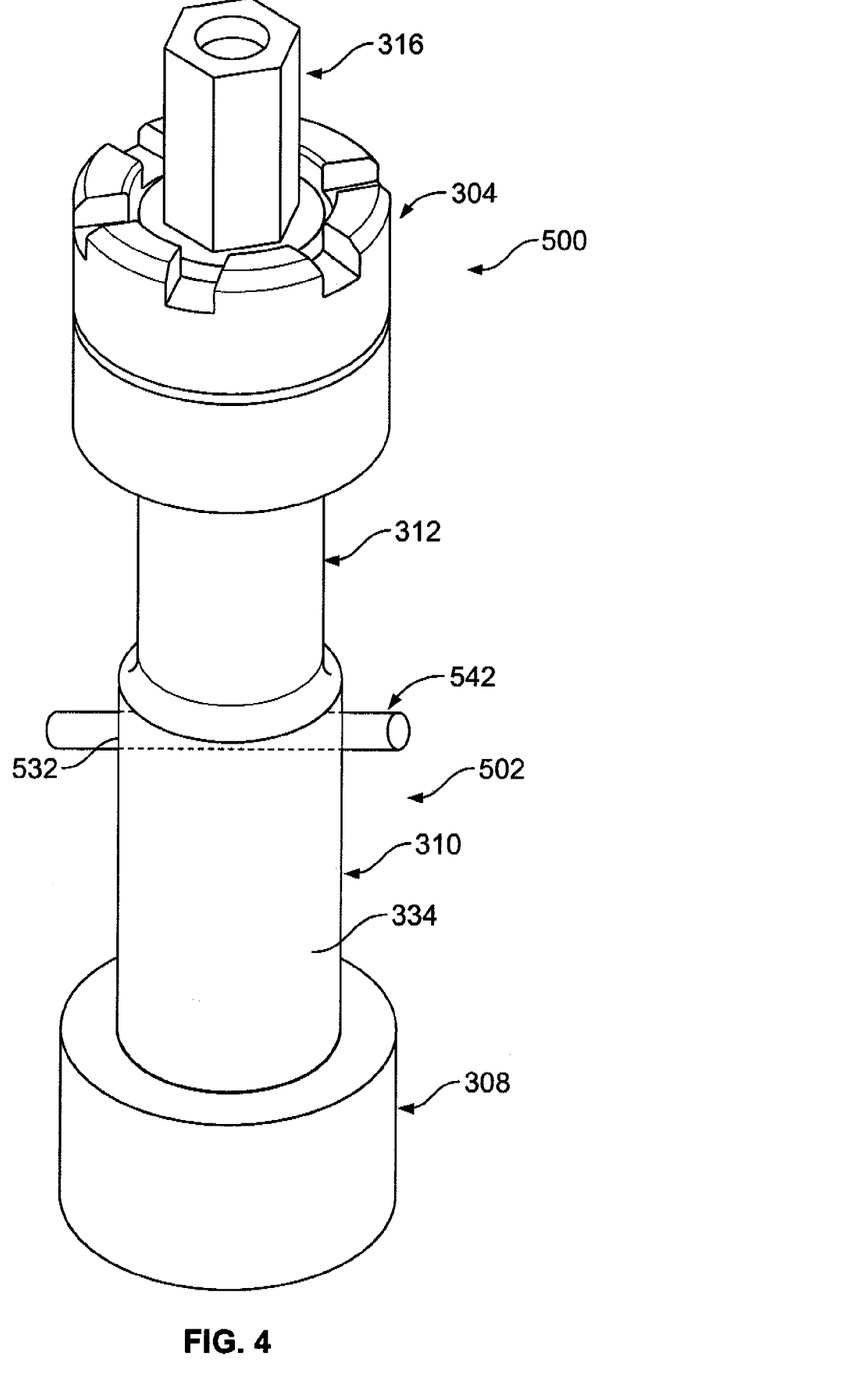
FIG. 4 is a perspective view of a first alternative bolt assembly that may be used with the shell casing shown in FIG. 2.

FIG. 4 is a perspective view of a first alternative bolt assembly 500 that may be used with shell casing 200. As shown in FIG. 4, bolt assembly 500 is similar to bolt assembly 300 and like components are identified with like reference numerals. FIG. 4 includes a bolt 502 that is similar to bolt 302 and like components are identified with like reference numerals.

Bolt 502 does not include groove 332 defined within outer surface 334 of second portion 310. As such, a retaining ring 342 is not coupled within groove 332. Rather, bolt 502 includes an opening 532 defined therein. Specifically, bolt 502 includes opening 352 defined within portion 310 such that opening 532 extends diametrically through portion 310. Opening 532 is configured to receive a radial pin 542 therein. Radial pin 542 is sized such that a portion of radial pin 542 extends outward from surface 334 when radial pin 542 is positioned within opening 352. Radial pin 542 facilitates retaining bolt 502 within flange 208 during assembly similar to retaining ring 342.

Figure 5:
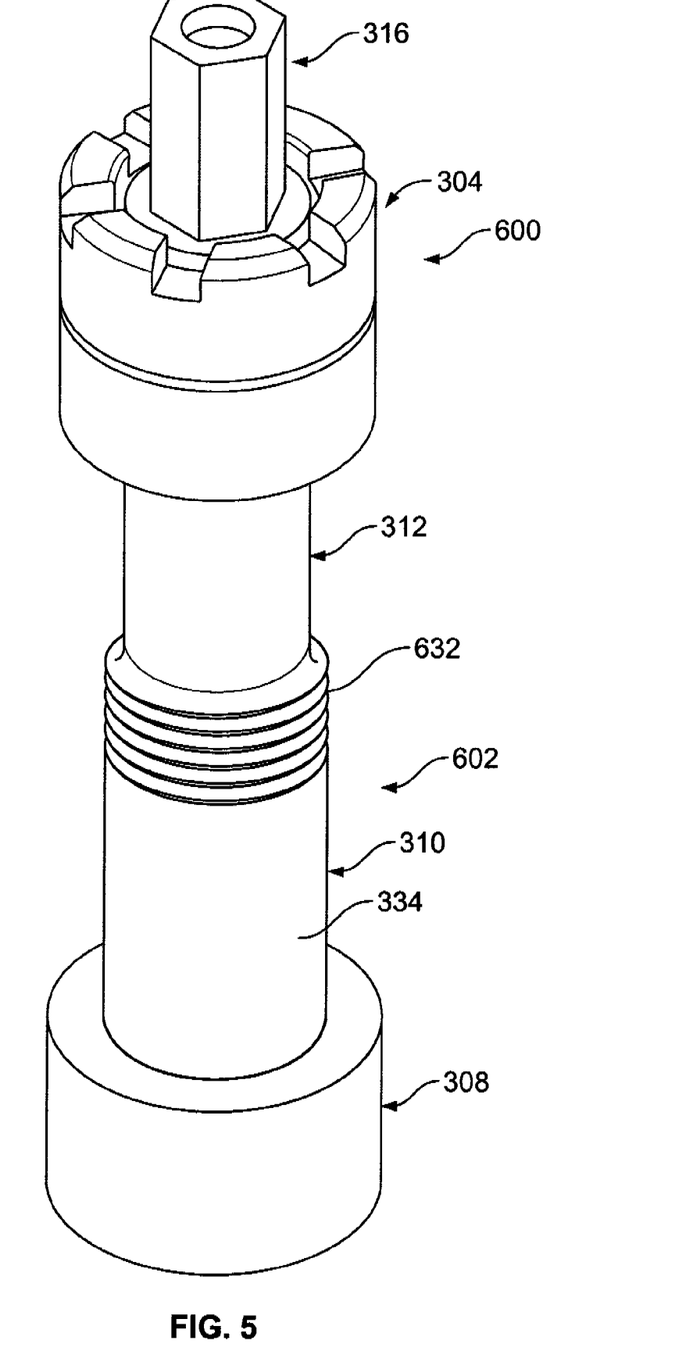
FIG. 5 is a perspective view of a second alternative bolt assembly that may be used with the shell casing shown in FIG. 2.

FIG. 5 is a perspective view of a second alternative bolt assembly 600 that may be used with shell casing 200. As shown in FIG. 5, bolt assembly 600 is similar to bolt assembly 300 and like components are identified with like reference numerals. FIG. 5 includes a bolt 602 that is similar to bolt 302 and like components are identified with like reference numerals.

Bolt 602 does not include groove 332 defined within outer surface 334 of second portion 310. As such, a retaining ring 342 is not coupled within groove 332. Rather, bolt 602 includes a plurality of threads 632 defined therein. Specifically, threads 632 are defined along surface 334 of portion 310 and are configured to engage a nut (not shown). The nut is sized to facilitate retaining bolt 602 within flange 208 during assembly.

Figure 6:
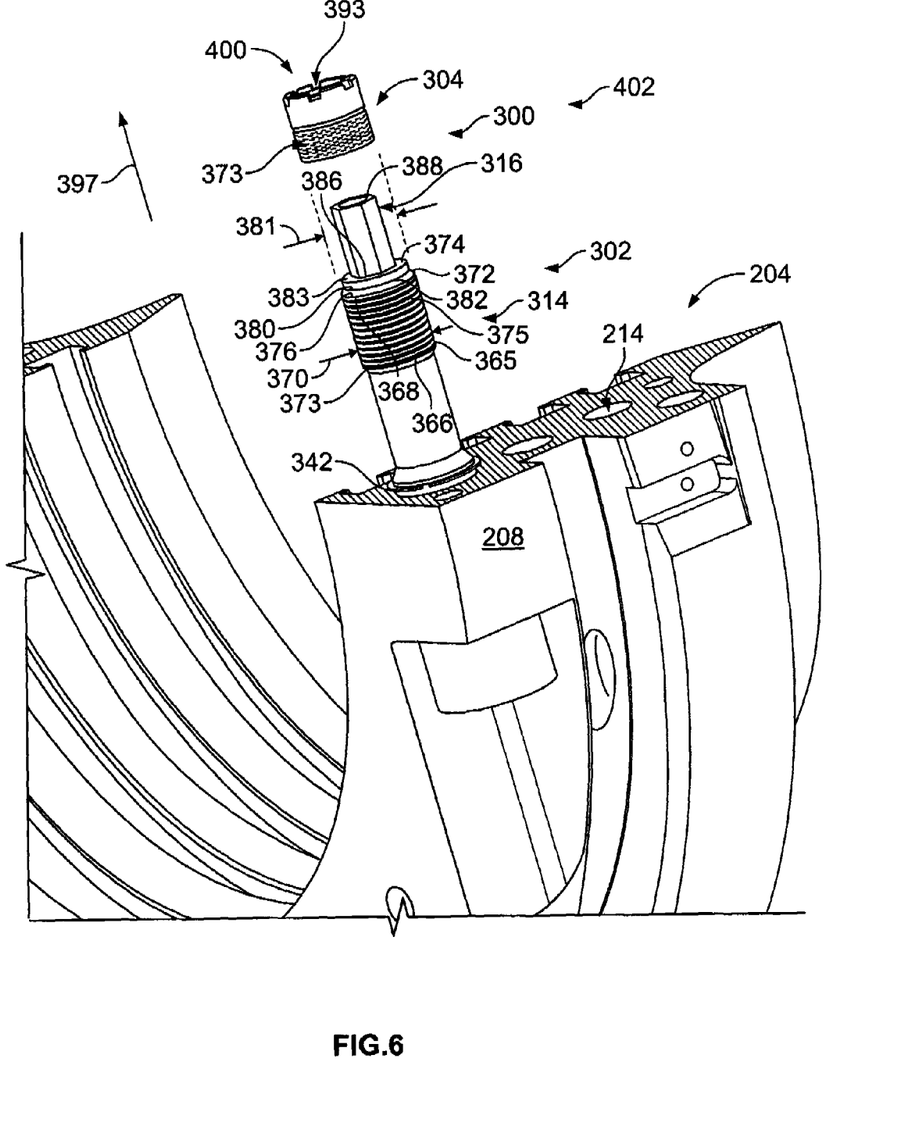
FIG. 6 is a perspective view of the bolt assembly shown in FIG. 3 and in a partially assembled configuration.
Figure 7:
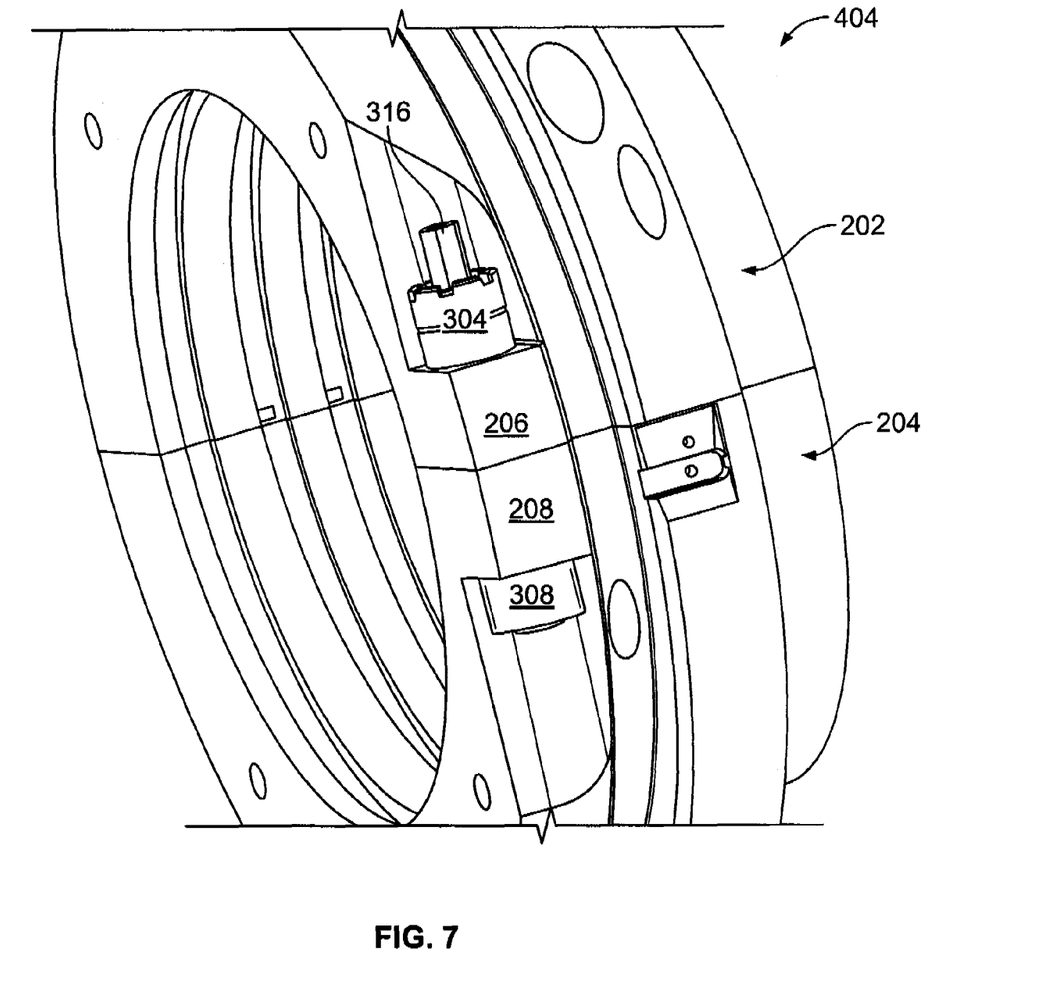
FIG. 7 is a perspective view of the bolt assembly shown in FIG. 3 in a fully assembled configuration.

FIG. 6 illustrates a perspective view of bolt assembly 300 in a partially assembled configuration 402. FIG. 7 is a perspective view of bolt assembly 300 in a fully assembled configuration 404. During assembly, bolt 302 is inserted into flange opening 212 in an upward direction 397. Bolt second end 303 is inserted from surface 213 through opening 212 such that a portion of bolt 302 extends a distance above surface 211. When bolt 302 is within opening 212, bolt second end 320 contacts flange surface 213 and second portion 310 is received within opening 212. In the exemplary embodiment, retaining ring 342 is then coupled within groove 332 to facilitate retaining bolt 302 within opening 212. Specifically, a portion of retaining ring 342 extending outward from portion 310 engages first surface 211, and prevents bolt 302 from falling out of opening 212 during assembly. Retaining ring 342 is sized to ensure load capacity and effectively "hold" bolt 302 within opening 212 during assembly.

In the first alternative embodiment, radial pin 542 is inserted at least partially through opening 532 such that a portion of radial pin 542 extends diametrically through bolt 502. Specifically, at least a portion of radial pin 542 extends outward from surface 334 of portion 310 to engage first surface 211 of flange 208 and to prevent bolt 502 from falling out of opening 212 during assembly.

In the second alternative embodiment, the second portion nut is threadably coupled to at least a portion of threads 632 to facilitate retaining bolt 602 within opening 212. Specifically, a portion of second portion nut engages first surface 211 and prevents bolt 602 from falling out of opening 212 during assembly.

Each opening 214 defined within casings 202 and 204 receives a dowel therein that facilitates the assembly of shell casing. Specifically, as upper casing 202 is coupled to casing 204, dowels facilitate aligning casing 202 and 204. Moreover, while coupling casing 202 to casing 204, bolt 302 is inserted into flange opening 210. Specifically, bolt end 303 is inserted into flange opening 210 in upward direction 397 until bolt 302 extends upward a distance from surface 207 of flange 206. Inserting bolt 302 into opening 210 and 212 in an upward direction eases assembly.

When bolt 302 is inserted through both casings 202 and 204, nut 304 is threadably coupled to bolt 302 coupling flanges 206 and 208 together. Specifically, nut 304 is threadably coupled to bolt portion 314. Bolt end 303 is inserted into nut opening 393, and nut 304 is rotated to tighten nut 304 to bolt 302. More specifically, at least one wrench (not shown) engages bolt portion 316 to prevent bolt 302 from rotating within openings 210 and 212. At least one wrench (not shown) engages nut slots 396 to rotate nut 304 with respect to stationary bolt 302 to couple nut 304 to bolt 302. As such, both wrenches are utilized on a single end of bolt 302. The two wrenches facilitate ensuring that nut 304 is properly tightened with an amount of torque that does not shred threads 373 and/or 395 and/or that does not adversely affect the structural integrity of bolt 302 and nut 304. To facilitate assembly of bolt assembly 300, heat may be applied into opening 306 to heat bolt 302 causing bolt 302 to thermally expand. Second portion 310 is sized to absorb most of the load applied to bolt 302 during thermal expansion. When bolt 302 cools, nut 304 is securely coupled to bolt 302.

During operation of steam turbine engine 100, bolt assembly 300 secures casing 202 and 204 together via flanges 206 and 208. When steam turbine engine 100 is not in operation, nut 304 may be removed from bolt 302, and bolt 302 removed from flanges 206 and/or 208. Moreover, bolt assembly 300 may be used in various engines and/or machines including a pair of flanges.

Described herein is a bolt assembly that may be used on a wide variety of engine assemblies and casings. The bolt assembly described herein uses an integrally formed bolt having a threaded portion configured to receive a threaded nut. The bolt assembly is configured to be inserted in an upward direction enabling a pair of flanges to be coupled together. A groove, an opening, and/or a plurality of threads are formed within a portion of the bolt such that the groove, the opening, and/or the plurality of threads are configured to receive a retaining ring, a radial pin, and/or a nut to ease assembly. The retaining ring, radial pin, and/or nut prevent the bolt from slipping and/or falling out of the flange opening during assembly.

Furthermore, the above-described assembly enables the nut to be threadably coupled to the bolt utilizing only one end of the bolt. Specifically, at least one first wrench engages a first end of the bolt to prevent the bolt from rotating within the flange openings, and at least one second wrench engages a portion of the nut to couple the nut to the first end of the bolt. The configuration of the bolt assembly enables the bolt assembly to be coupled within the flange openings when space constraints are present. Moreover, the configuration of the nut and bolt assembly enables the nut to be coupled and tightened to the bolt with an amount of torque that does not shred the threads defined within the bolt and/or within the nut. The above-described bolt assembly improves the assembly of steam turbine engines with a low cost modification.

An exemplary embodiment of a bolt assembly for an engine assembly is described above in detail. The bolt assembly illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A method of assembling a turbine casing, said method comprising:
   inserting a bolt assembly through a first opening defined generally vertically through a first flange extending from a first casing member, such that a portion of the bolt assembly extends a distance upward from an upper surface of the first casing flange and such that the bolt assembly is retained within the first opening;
   positioning a second casing member including a second flange including a second opening defined therein against the first casing member such that a portion of the bolt assembly extends through the opening defined in the second casing flange; and
   coupling a nut to the bolt assembly, wherein the nut is formed with a plurality of radial slots that enable a wrench to engage the nut during assembly of the turbine casing.

2. A method in accordance with claim 1 further comprising coupling a retaining ring within a groove defined within the bolt such that the retaining ring at least partially circumscribes the bolt.

3. A method in accordance with claim 2 wherein coupling a nut comprises coupling the nut to the bolt to couple the first casing member to the second casing member.

4. A method in accordance with claim 3 further comprising tightening the nut to the bolt and against the second flange using a first wrench engaging the nut, a second wrench engaging the bolt adjacent the nut.

5. A method in accordance with claim 1 further comprising inserting a radial pin at least partially within a radial opening defined within the bolt such that the radial pin extends a distance outward from a radially outer surface of the bolt to facilitate retaining the bolt within the first flange.

6. A method in accordance with claim 1 further comprising defining a plurality of threads along a radially outer surface of the bolt such that a second nut is configured to couple to the plurality of threads to facilitate retaining the bolt within the first flange.

7. A method in accordance with claim 1 further comprising providing heat to a bore extending through the bolt to facilitate heating the bolt assembly.

8. A steam turbine engine assembly comprising:
   at least one casing comprising a flange comprising at least one opening extending through said flange; and
   a bolt assembly configured to be inserted within said at least one casing, said bolt assembly comprising:
   a bolt;
   a nut configured to threadably couple to said bolt, said nut formed with a plurality of radial slots that enable a wrench to engage said nut during assembly of said bolt assembly; and
   a retaining mechanism, said bolt configured to be inserted from a lower surface of said flange through said at least one opening such that a portion of said bolt extends a distance above an upper surface of said flange, said bolt retaining mechanism facilitates retaining said bolt within said at least one opening.

9. A steam turbine engine assembly in accordance with claim 8 wherein said retaining mechanism is a retaining ring that at least partially circumscribes said bolt.

10. A steam turbine engine assembly in accordance with claim 9 wherein said retaining ring comprises a slot defined therein, said slot facilitates coupling said retaining ring to said bolt.

11. A steam turbine engine assembly in accordance with claim 8 wherein said bolt further comprises a plurality of threads defined therein.

12. A steam turbine engine assembly in accordance with claim 11 wherein said retaining mechanism is a second nut configured to couple to said plurality of threads configured to retain said bolt within said at least one opening.

13. A steam turbine engine assembly in accordance with claim 8 wherein said bolt further comprises at least one opening defined within an outer surface of said bolt.

14. A steam turbine engine assembly in accordance with claim 13 wherein said retaining mechanism is a radial pin configured to be inserted at least partially through said opening.

15. A steam turbine engine assembly in accordance with claim 8 wherein said nut is configured to couple said at least one casing to a second casing.

16. A steam turbine engine assembly in accordance with claim 8 wherein said bolt comprises a head and an opposite end, said opposite end comprises a plurality of wrench flats, said nut is threadably coupled to said bolt end, said plurality of wrench flats facilitate assembly of said bolt assembly.

17. A steam turbine in accordance with claim 8 wherein said bolt comprises a bore extending concentrically therethrough, said bore facilitates heating said bolt during assembly.

18. A bolt assembly for a steam turbine engine assembly including at least one casing including a flange including at least one opening extending through the flange, said bolt assembly comprising:
  a bolt configured to be inserted within the at least one casing, said bolt is configured to be inserted from a lower surface of the flange through the at least one opening such that a portion of said bolt extends a distance above an upper surface of the flange; and
  a retaining mechanism extending through said bolt such that said retaining mechanism facilitates retaining said bolt within the at least one opening.

19. A bolt assembly in accordance with claim 18 wherein said retaining mechanism comprises a radial pin.

* * * * *